Sept. 23, 1958     G. D. CHAVIS ET AL     2,852,955
DRIVING LINKAGE
Filed March 27, 1953     2 Sheets-Sheet 1
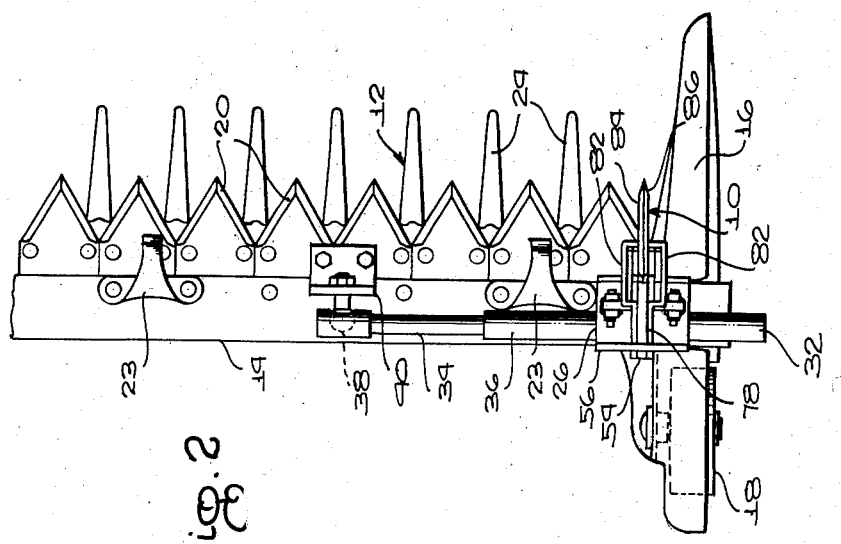
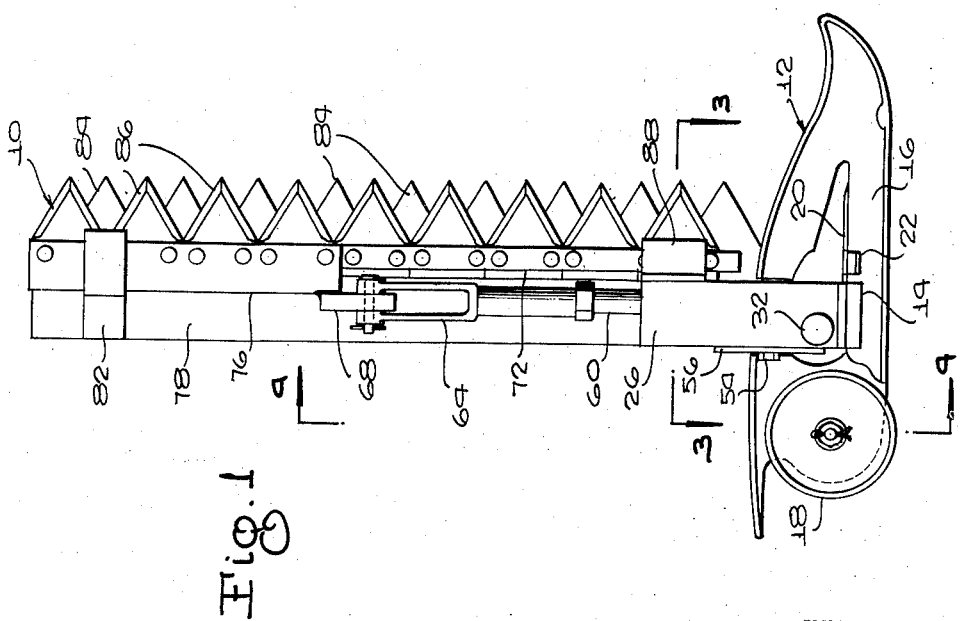
INVENTORS
GEORGE D. CHAVIS
& HAL O. SNOW
BY
McMorrow, Berman + Davidson
ATTORNEYS Sept. 23, 1958    G. D. CHAVIS ET AL    2,852,955
DRIVING LINKAGE
Filed March 27, 1953    2 Sheets-Sheet 2
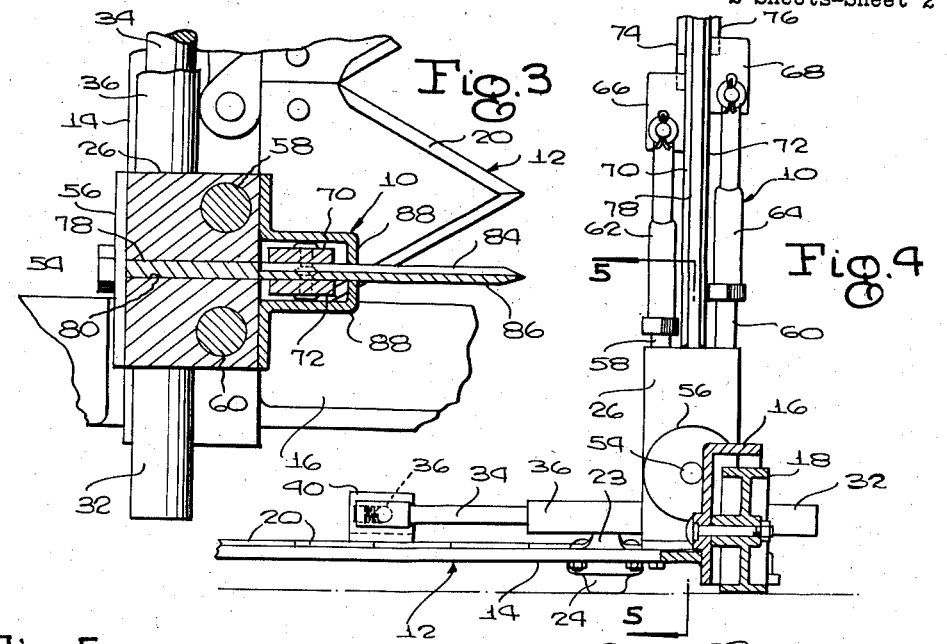
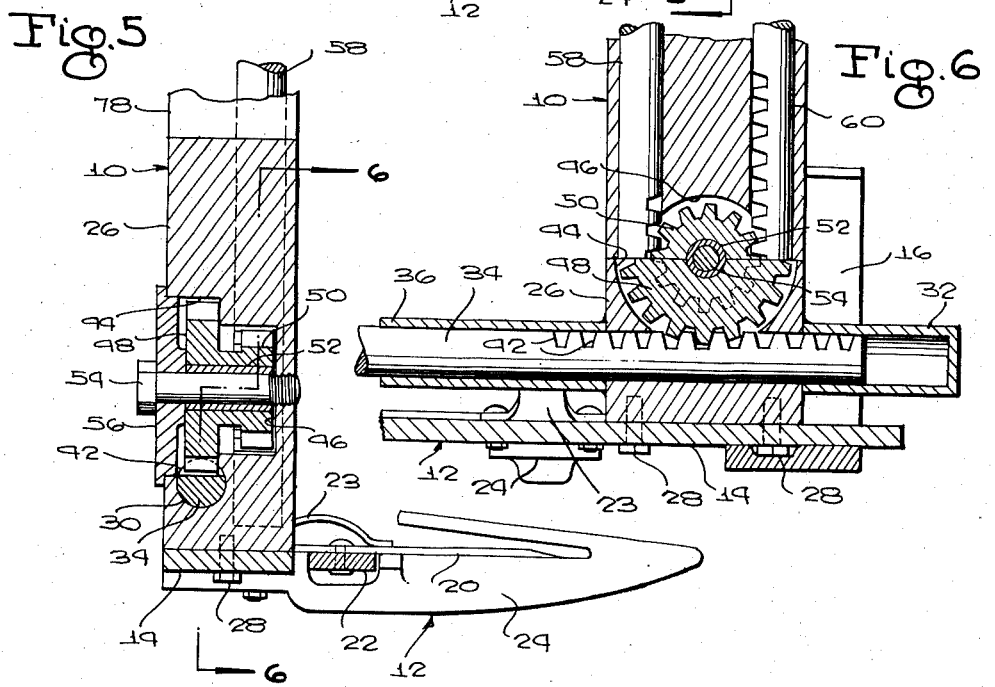
INVENTORS
GEORGE D. CHAVIS
& HAL O. SNOW
BY
McMorrow, Berman & Davidson
ATTORNEYS United States Patent Office 2,852,955
Patented Sept. 23, 1958

2,852,955
DRIVING LINKAGE

George D. Chavis and Hal O. Snow,
Sedro Woolley, Wash.

Application March 27, 1953, Serial No. 345,058

3 Claims. (Cl. 74—422)

It is clearly desirable, in many instances, that a mower of the type having a horizontally reciprocating sickle bar be provided with a vertically reicrpocating sickle at one or both sides thereof. A vertical sickle attachment will, in many instances, effect a substantial saving in labor, since it is not necessary, when such an attachment is used, to have laborers following the mowing machine with pitchforks. Further, a properly designed vertical attachment of the type stated will cause a full, clean swath to be cut, and will reduce side draft. In this way, drag and strain of the mowing machine is minimized. Still further, such an attachment as we have designed will not choke up, and mowing operations can be carried on substantially continuously, without the necessity of the mowing machine operator halting the machine to clean out the sickle. A still further advantage resides in the characteristic of the vertical sickle attachment, whereby it will cut any tangled crop.

The main object of the present invention is to provide a vertical sickle attachment for mowing machines such as reapers, binders, and the like, the attachment including a driving linkage which will achieve the desirable results noted above.

Another important object is to provide a driving linkage wherein the vertical repciprocating motion of the sickle bar or bars of the attachment will be effected responsive to horizontal reciprocation of the conventional horizontal bar, without requirement of adding a separate prime mover to the mowing machine structure.

Still another object is to provide a motion-translating linkage extending from the horizontal to the vertical sickle bar, which linkage will include rack and gear means wholly enclosed in a sealed gear case and running in oil without the danger of said linkage becoming fouled with dirt, cuttings, etc.

Other objects will appear from the following description, the claims appended thereto, and from the annexed drawings, in which like reference characters designate like parts throughout the several views, and wherein:

Figure 1 is a side elevational view of a sickle assembly of a mowing machine, equipped with a vertical sickle attachment formed in accordance with the present invention;

Figure 2 is a top plan view in which the horizontal sickle bar is partially broken away;

Figure 3 is an enlarged, fragmentary, transverse sectional view on line 3—3 of Figure 1;

Figure 4 is a vertical sectional view taken on line 4—4 of Figure 1;

Figure 5 is an enlarged vertical sectional view on line 5—5 of Figure 4; and

Figure 6 is a vertical sectional view on line 6—6 of Figure 5.

The vertical sickle attachment 10 including the driving linkage constituting the present invention is mounted upon, and extends upwardly from one end of, the horizontal sickle assembly 12 of a mowing machine. Assembly 12 is generally conventional, and includes an elongated, horizontal, stationary sickle support bar 14 extending transversely of the front end of the mowing machine. A tapered, peripherally flanged shoe 16 is rigid with the end of the sickle support bar 14, and rotatably mounted upon said shoe is a ground wheel or roller 18.

Referring to Figure 2, a longitudinal series of forwardly projected, pointed teeth 20 extends from end to end of sickle support bar 14, the teeth of said series being affixed to a horizontally reciprocating sickle bar 22 extending in parallelism with and slidably mounted upon the support bar 14. Hold-down springs 23 (Figure 2), secured to the bar 14 at locations spaced longitudinally thereof, exert downward pressure against the series of teeth 20, to hold the reciprocating sickle bar 22 downwardly during horizontal motion thereof.

Rigid with and projecting forwardly from the horizontal bar 14 are equidistantly spaced, reversely bent guards 24 (Figures 2 and 5), said guards alternating with the teeth 20.

The above described structure is a generally conventional sickle bar assembly such as is found on many mowing machines, and does not per se constitute part of the present invention. The reciprocating bar 22, in such machines, is driven by a suitable power means, not shown.

The vertical sickle attachment 10 includes a gear case 26 secured by bolts 28 to one end of the sickle support bar 14. Gear case 26 is of rectangular cross section, and extends upwardly from the bar 14 a short distance. In the lower end portion of the case, a transverse bore 30 is formed (Figure 6), said bore opening at one end into a cylindrical housing 32 affixed to and projecting laterally from, the gear case. Housing 32 is aligned coaxially with bore 30, and receives the outer end of a rack 34 mounted in the bore 30 for axial reciprocation. Rack 34 has its inner end portion sliding in a cylindrical housing extension 36, the inner end of said rack projecting out of the open outer end of said extension or sleeve 36.

The inner end of the rack 34 is provided with a ball housing, in which is engaged a ball 38 rigid with a stub shaft secured to an angular bracket 40 bolted to the horizontally reciprocating, toothed sickle bar 22.

That portion of rack 34 that is slidable in bore 30 is formed with a longitudinal series of rack teeth 42 projecting into a recess 44 formed in the gear case 26 (Figure 5). The inner end of recess 44 is reduced in diameter as at 46, and mounted in the outer, larger portion of the recess is a large gear 48 in mesh with the rack 34. Rigid with gear 48 is a small gear or pinion 50 rotating in the smaller, inner portion of recess 44 and disposed in concentric relation to the larger gear. A bushing 52 extends through a center opening formed in the connected gears 48, 50, and is circumposed about a gear shaft 54 which may comprise a conventional bolt threadedly engaged in a complementarily threaded opening of gear case 26. Bolt 54 not only provides a shaft on which the gears rotate, but also serves to hold in position a peripherally shouldered cover 56. The cover 56, as will be noted from Figure 5, closes the recess 44, and thus, the recess can be filled with a suitable lubricant, in which the gears rotate.

From the description which has so far been provided, it is apparent that horizontal reciprocation of the sickle bar 22 will cause the rack 34 to be horizontally reciprocated therewith. Rack 34, in turn, imparts rotary motion to gears 48, 50, the direction in which said gears rotate being changed each time the direction of straight line movement of the horizontal sickle bar 22 changes.

Vertically disposed, transversely spaced, vertical push rods or racks 58, 60 are mounted in parallel, vertical bores formed in gear case 26, said bores opening at their lower ends into the smaller portion 46 of recess 44. The inwardly facing teeth of racks 58, 60 extend into the recess portion 46, and are in mesh with the gear 50, at diametrically opposite locations upon said gear. Accordingly, the racks 58, 60 will be vertically reciprocated by gear or pinion 50, with said racks 58, 60 being simultaneously reciprocated in opposite directions, rack 58 moving upwardly when rack 60 is moving downwardly, and moving downwardly when rack 60 is shifted upwardly.

The upper ends of the racks or push rods 58, 60 project above the gear case 26, and are connected to upwardly extending yokes 62, 64 respectively. Connected to the upper ends of the yokes (Figure 4) are ears 66, 68, connected to parallel, vertically reciprocable sickle bars 70, 72 by means of longitudinal brace bars 74, 76. In this connection, it may be noted from Figure 1 that the bars 70, 72 are disposed forwardly of the push rods and yokes, the brace bars 76 being arranged longitudinally of their associated vertical sickle bars and having their rear longitudinal edges projecting rearwardly and welded or otherwise fixedly connected to the ears 66, 68.

A stationary, vertically disposed sickle support bar 78 has its lower end fixedly engaged in an upwardly opening slot 80 (Figure 3) of gear case 26. Sickle support bar 78, adjacent its upper end, has fixedly secured thereto a pair of forwardly extended guides 82 (Figure 2), and in slidable contact with the forwardly projected ends of the guides are teeth 84, 86 secured to the vertical sickle bars 70, 72 respectively. The vertical sickle bars are thus slidably mounted upon the stationary sickle support bar 78. The lower end portions of the vertically reciprocating bars 72, 70 are slidably engaged in guides 88 secured to and projecting forwardly from the upper end portion of gear case 26.

It will be seen that when the horizontal sickle bar of the mowing machine is reciprocated by a suitable, conventional prime mover and associated driving linkage, the horizontal reciprocating motion will be translated by means of the linkage shown in Figure 6 into vertically reciprocating motion of the toothed, vertical sickle bars 70, 72. The vertical sickle bars will be reciprocated oppositely to one another, with the teeth 84, 88 thereof slidably contacting during the vertical reciprocating motion of their associated sickle bars. As a result, a cutting action will be set up throughout the length of the vertical attachment, which cutting action will be effective to cut tangled crops, reduce side draft and its attendant drag and strain on the mowing machine, and cut a full, clean swath. The motion translating linkage is, of course, entirely enclosed in a gear case common to all parts of said linkage, said gear case being sealed to permit the several parts to run in oil or an equivalent lubricant. The bores in which the racks or push rods 34, 58, and 60 are reciprocated can, of course, be provided with packing rings or other lubricant sealing devices, to prevent loss of lubricant, it being considered that this is sufficiently obvious as not to require special illustration herein.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A sealed driving linkage comprising: a gear case in the form of an elongated, rectangular block having intermediate its ends a deep, closed cavity, said case being formed with a transverse bore communicating intermediate its ends with said cavity, said bore being closed at one end and open at the other, the case having a pair of straight second bores each of which is in communication with the cavity, said second bores being closed at one end and open at the other, the second bores extending longitudinally of the case in perpendicular relation to the first bore and opening upon the cavity at diametrically opposite locations in the cavity, the first bore opening upon the cavity medially between the locations at which the second bores open thereon; drive and driven gears mounted in said cavity and connected for conjoint rotation, the drive gear extending partially into the first bore and the driven gear projecting at diametrically opposite locations into the respective second bores; a first rack mounted within the first bore for axial reciprocation, said first rack projecting out of the open end of the first bore and having a series of rack teeth extending for part only of the length of the first rack, said series, in opposite extreme positions to which the first rack is moved, being confined wholly within the first bore, the open end of the first bore being completely filled by an untoothed part of the first rack in both of said extreme positions of the first rack, the drive gear being in mesh, within the first bore, with the rack teeth; and a pair of second racks axially reciprocating within the respective second bores, each second rack having a series of rack teeth for part only of its length with the several rack teeth of each second rack being confined wholly within the associated second bore in opposite extreme positions of the second racks, the driven gear being in mesh, at diametrically opposite locations thereon, with the rack teeth of the respective second racks, for simultaneous but opposite reciprocation of the second racks responsive to reciprocating movement of the first rack, said second racks having untoothed portions filling the open ends of the second bores in opposite extreme positions of the respective second racks.

2. A sealed driving linkage comprising: a gear case in the form of an elongated, rectangular block having intermediate its ends a deep, closed cavity, said case being formed with a transverse bore communicating intermediate its ends with said cavity, said bore being closed at one end and open at the other, the case having a pair of straight second bores each of which is in communication with the cavity, said second bores being closed at one end and open at the other, the second bores extending longitudinally of the case in perpendicular relation to the first bore and opening upon the cavity at diametrically opposite locations in the cavity, the first bore opening upon the cavity medially between the locations at which the second bores open thereon; drive and driven gears mounted in said cavity and connected for conjoint rotation, the drive gear extending partially into the first bore and the driven gear projecting at diametrically opposite locations into the respective second bores; a first rack mounted within the first bore for axial reciprocation, said first rack projecting out of the open end of the first bore and having a series of rack teeth extending for part only of the length of the first rack, said series, in opposite extreme positions to which the first rack is moved, being confined wholly within the first bore, the open end of the first bore being completely filled by an untoothed part of the first rack in both of said extreme positions of the first rack, the drive gear being in mesh, within the first bore, with the rack teeth; and a pair of second racks axially reciprocating within the respective second bores, each second rack having a series of rack teeth for part only of its length with the several rack teeth of each second rack being confined wholly within the associated second bore in opposite extreme positions of the second racks, the driven gear being in mesh, at diametrically opposite locations thereon, with the rack teeth of the respective second racks, for simultaneous but opposite reciprocation of the second racks responsive to reciprocating movement of the first rack, said second racks having untoothed portions filling the open ends of the second bores in opposite extreme positions of the respective second racks, said cavity being of circular cross-section at all locations through the full depth thereof, the several bores extending in tangential relation to the cavity to provide for said communication of the several bores with the cavity, and to provide for partial projection of the drive and driven gears into the respective first and second bores.

3. A sealed driving linkage comprising: a gear case in the form of an elongated, rectangular block having intermediate its ends a deep, closed cavity, said case being formed with a transverse bore communicating intermediate its ends with said cavity, said bore being closed at one end and open at the other, the case having a pair of straight second bores each of which is in communication with the cavity, said second bores being closed at one end and open at the other, the second bores extending longitudinally of the case in perpendicular relation to the first bore and opening upon the cavity at diametrically opposite locations in the cavity, the first bore opening upon the cavity medially between the locations at which the second bores open thereon; drive and driven gears mounted in said cavity and connected for conjoint rotation, the drive gear extending partially into the first bore and the driven gear projecting at diametrically opposite locations into the respective second bores; a first rack mounted within the first bore for axial reciprocation, said first rack projecting out of the open end of the first bore and having a series of rack teeth extending for part only of the length of the first rack, said series, in opposite extreme positions to which the first rack is moved, being confined wholly within the first bore, the open end of the first bore being completely filled by an untoothed part of the first rack in both of said extreme positions of the first rack, the drive gear being in mesh, within the first bore, with the rack teeth; and a pair of second racks axially reciprocating within the respective second bores, each second rack having a series of rack teeth for part only of its length with the several rack teeth of each second rack being confined wholly within the associated second bore in opposite extreme positions of the second racks, the driven gear being in mesh, at diametrically opposite locations thereon, with the rack teeth of the respective second racks, for simultaneous but opposite reciprocation of the second racks responsive to reciprocating movement of the first rack, said second racks having untoothed portions filling the open ends of the second bores in opposite extreme positions of the respective second racks, said cavity being of circular cross-section at all locations through the full depth thereof, the several bores extending in tangential relation to the cavity to provide for said communication of the several bores with the cavity, and to provide for partial projection of the drive and driven gears into the respective first and second bores, said second racks reciprocating in a common plane offset laterally of the first rack.

References Cited in the file of this patent

UNITED STATES PATENTS

| 761,359 | Clarkson | May 31, 1904 |
| 968,312 | Bacon | Aug. 23, 1910 |
| 1,597,578 | Burke | Aug. 24, 1926 |
| 1,775,940 | McBride | Sept. 16, 1930 |
| 1,816,571 | Drissner | July 28, 1931 |
| 2,284,517 | Fink | May 28, 1942 |

FOREIGN PATENTS

| 3,652 | Great Britain | Sept. 16, 1878 |